United States Patent
Aono et al.

[11] Patent Number: 5,859,668
[45] Date of Patent: Jan. 12, 1999

[54] PREDICTION MODE SELECTING DEVICE IN MOVING IMAGE CODER

[75] Inventors: Tomoko Aono, Chiba; Toshiyuki Miyake, Tenri; Hiroyuki Katata, Ichihara; Yoichi Fujiwara; Hiroshi Kusao, both of Chiba, all of Japan

[73] Assignee: Sharp Kabushiki Kaisha, Osaka, Japan

[21] Appl. No.: 757,905

[22] Filed: Nov. 27, 1996

Related U.S. Application Data

[63] Continuation of Ser. No. 357,161, Dec. 13, 1994, abandoned.

[30] Foreign Application Priority Data

Dec. 13, 1993 [JP] Japan .................................. 5-311516

[51] Int. Cl.$^6$ .................................................. H04N 7/18
[52] U.S. Cl. .......................... 348/416; 348/410; 348/411; 348/412; 348/413; 348/699; 348/700
[58] Field of Search .................................... 348/413, 412, 348/411, 410, 409, 416, 699, 700

[56] References Cited

U.S. PATENT DOCUMENTS

| | | | |
|---|---|---|---|
| 5,132,792 | 7/1992 | Yonemitsu et al. | 348/411 |
| 5,227,878 | 7/1993 | Puri et al. | 348/416 |
| 5,245,438 | 9/1993 | Alattar | 348/413 |
| 5,249,048 | 9/1993 | Sugiyama | 348/699 |
| 5,353,062 | 10/1994 | Maeda | 348/412 |
| 5,357,287 | 10/1994 | Koo et al. | 348/699 |
| 5,376,968 | 12/1994 | Wu et al. | 348/415 |
| 5,386,234 | 1/1995 | Veltman et al. | 348/412 |
| 5,394,190 | 2/1995 | Yamada | 348/411 |
| 5,412,435 | 5/1995 | Nakajima | 348/699 |
| 5,416,522 | 5/1995 | Igarashi | 348/699 |
| 5,438,374 | 8/1995 | Yan | 348/416 |
| 5,453,799 | 9/1995 | Yang | 348/699 |
| 5,461,421 | 10/1995 | Moon | 348/699 |
| 5,537,147 | 7/1996 | Tahara | 348/416 |
| 5,561,477 | 10/1996 | Polit | 348/700 |
| 5,565,922 | 10/1996 | Krause | 348/413 |
| 5,570,133 | 10/1996 | Yagasaki | 348/416 |
| 5,574,504 | 11/1996 | Yagasaki et al. | 348/415 |
| 5,608,458 | 3/1997 | Chen et al. | 348/413 |

FOREIGN PATENT DOCUMENTS

| | | |
|---|---|---|
| 484140 A2 | 5/1992 | European Pat. Off. . |
| 542474 A2 | 5/1993 | European Pat. Off. . |
| 573665 A1 | 12/1993 | European Pat. Off. . |
| 606868 A2 | 7/1994 | European Pat. Off. . |
| 618731 A2 | 10/1994 | European Pat. Off. . |
| WO9313626 | 7/1993 | WIPO . |

OTHER PUBLICATIONS

"Generic Coding of Moving Pictures and Associated Audio", ISO/IEC Information technology, Recommendation H. 26x, pp. 55–60.
ISO/IEC MPEG Video Simulation Model Three, pp. 21–26.

*Primary Examiner*—Tommy P. Chin
*Assistant Examiner*—Anand S. Rao

[57] ABSTRACT

A moving image coder has a forward predicting motion vector/prediction error amount detecting section for detecting an optimum motion vector from a past frame, making a predicted image and calculating a prediction error amount from the present frame. The coder also has a backward predicting motion vector/prediction error amount detecting section for detecting an optimum motion vector from a future frame, making a predicted image and calculating a prediction error amount from the present frame. The coder further has a comparator/mode selecting section for inputting the prediction error amounts from the forward predicting motion vector/prediction error amount detecting section and the backward prediction motion vector/prediction error amount detecting section, making a comparative calculation of the input prediction error amounts, and selecting one of a forward prediction mode, a backward prediction mode and a bidirectional prediction mode.

18 Claims, 8 Drawing Sheets

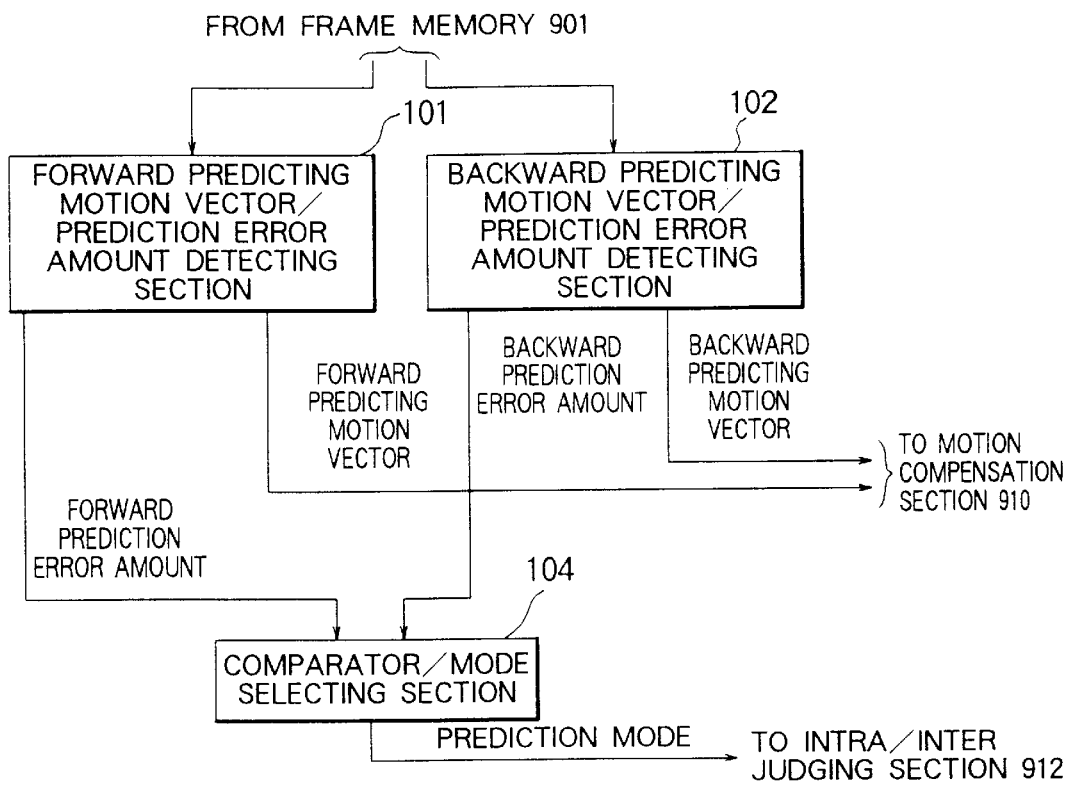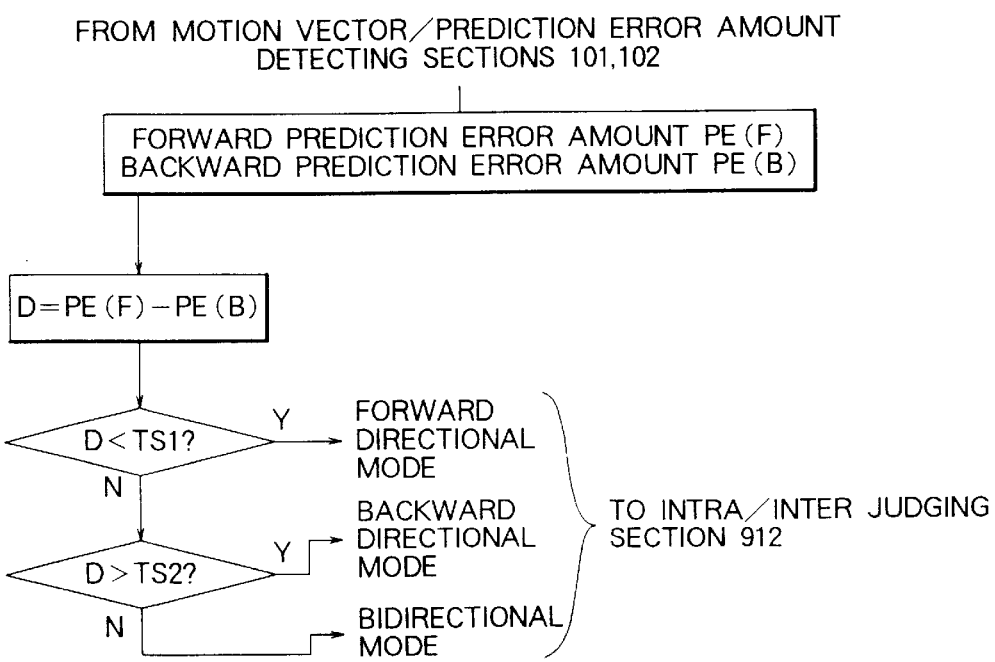

PREDICTION MODE SELECTING DEVICE IN MOVING IMAGE CODER

This application is a continuation of application Ser. No. 08/357,161 filed on Dec. 13, 1994, now abandoned.

BACKGROUND OF THE INVENTION

1. Field of the Invention

The present invention relates to a digital image processor. More particularly, the present invention relates to a moving image coder for coding image data with high efficiency.

2. Description of the Related Art

In a general coding method, a digital moving image is divided into small blocks and a prediction mode is selected every image block. After an orthogonal transform of the moving image is performed with respect to a prediction error, the moving image is adaptively quantized. For example, this coding method is proposed in a coding system between MPEG2 frames by Hiroshi Watanabe in ITEJ Technical Report Vol. 16, No. 61, p37–42 ICS '92–73 (October 1992).

As shown in FIG. 11, a moving image can be considered as a series of frames continuous in a time direction. Since these frames are continuous in the time direction, an arbitrary frame has a high correlation with respect to a frame adjacent to this arbitrary frame. Image data can be effectively compressed by using prediction coding between the frames. Here, an I-frame is an intra frame for coding the moving image by using only information of the present frame.

A P-frame is a frame predicted in a forward direction. The I-frame or the P-frame is used as a past frame. In this case, the forward prediction shows a frame prediction mode for making a prediction from the past frame. A B-frame is a frame capable of selecting one prediction from three kinds of predictions composed of the forward prediction, a backward prediction and a bidirectional prediction. Here, the backward prediction shows a frame prediction mode for making a prediction from a future frame. The bidirectional prediction shows a frame prediction mode using interpolation from both the past and future.

The I-frame or the P-frame is used as the past or future frame. In a method for selecting the I or P frame, the I or P frame is selected such that the I or P frame has a minimum error amount among an error amount of the forward prediction, an error amount of the backward prediction and an error amount of the bidirectional prediction. In this case, the prediction error is set to an error in prediction with respect to an interpolated image made by an average of two frames of the past and future frames or made by interpolation.

FIG. 9 is a block diagram showing one constructional example of a general coder. In FIG. 9, a frame memory 901 stores an input image. The frame memory 901 can store a plurality of frames to calculate a motion vector. An orthogonal transform section 902 converts a divisional image divided into image blocks to data suitable for coding by a two-dimensional orthogonal transform every image block. A quantizer 903 quantizes the converted data in accordance with a suitable quantizing step size. A variable length coding section 904 codes a quantized value at a variable length in accordance with a predetermined code table and outputs the coded value as a transmission line code.

A buffer 905 accumulates and smooths data from the variable length coding section 904 to output these data at a constant rate. An inverse quantizer 906 inversely quantizes an output of the quantizer 903. An inverse orthogonal transform section 907 performs an inverse orthogonal transform with respect to an output of the inverse quantizer 906. Each of frame memories 908 and 909 stores an image required for each of forward and backward predictions.

A motion compensation section 910 makes a motion compensation prediction in a forward direction, a backward direction or a bidirection by using a motion vector as an output of a motion vector detection/prediction mode judging section 911 described later and a selected prediction mode. A motion vector detection/prediction mode judging section 911 detects an image movement from the image stored to the frame memory 901 and selects an optimum prediction mode from three kinds of predictions composed of the forward directional, backward directional and bidirectional predictions with respect to each of the image blocks. An intra/inter judging section 912 determines whether each of the image blocks is coded within a frame or is coded between frames.

The image of the frame memory 901 is divided into image blocks, and a difference between a divisional image and a predicted image from the motion compensation section 910 is calculated. A calculated differential value is orthogonally transformed by the orthogonal transform section 902 and is quantized by the quantizer 903. The quantized value is further coded by the variable length coding section 904 and is output to the coding buffer 905. An output of the quantizer 903 is added to the predicted image from the motion compensation section 910 through the inverse quantizer 906 and the inverse orthogonal transform section 907, and is stored to each of the frame memories 908 and 909. An image from each of the frame memories 908 and 909 is used as data of a subsequent predicted image in accordance with outputs of the motion vector detection/prediction mode judging section 911 and the intra/inter judging section 912.

FIG. 10 shows the motion vector detection/prediction mode judging section 911 in detail. A forward predicting motion vector/prediction error amount detecting section 001 calculates prediction error amounts of past and present frames in the forward prediction, and finds a vector providing a minimum prediction error amount. A backward predicting motion vector/prediction error amount detecting section 002 calculates prediction error amounts of future and present frames in the backward prediction, and finds a vector providing a minimum prediction error amount. A bidirectional prediction error amount detecting section 003 makes an interpolated image predicted in both directions by using the forward and backward directional motion vectors calculated by the detecting sections 001 and 002. The bidirectional prediction error amount detecting section 003 then calculates a prediction error amount with respect to the present frame. A comparator/mode selecting section 004 compares the error amounts of the forward prediction, the backward prediction and the bidirectional prediction with each other and calculates a minimum error amount value. The comparator/mode selecting section 004 then selects each of a forward prediction mode, a backward prediction mode and a bidirectional prediction mode.

Here, the motion vector shows a motion amount provided when the prediction error amount is minimized by matching the present and predicted frames every image block within a search region predetermined with respect to each of the image blocks. For example, when a distance between the present and predicted frames is set to n, the search region can be formed by ±16n in horizontal and vertical directions. In the following description, B(i,i) shows a present block and PB (i, j) shows a predicted block. Here, i and j respectively show block positions in the horizontal and vertical directions. (mx,my) shows a motion vector. In this case, a prediction error PE is represented by the following formula (1).

$$PE = \sum_{i=1}^{xsize} \sum_{j=1}^{ysize} (B(i,j) - PB(i+mx, j+my))^2$$

In this formula, xsize and ysize respectively show block sizes in the horizontal and vertical directions.

Instead of this formula, the following formula (2) may be used.

$$PE = \sum_{i=1}^{xsize} \sum_{j=1}^{ysize} |B(i,j) - PB(i+mx, j+my)|$$

Thus, moving image data are compressed by using a motion vector having a best compression efficiency.

In the general motion vector detection/prediction mode judging section shown in FIG. 10, it is necessary to calculate the forward prediction error amount with respect to the P-frame and calculate the forward prediction error amount, the backward prediction error amount and the bidirectional prediction error amount with respect to the B-frame. The forward prediction error amount of the P-frame and the forward prediction error amount and the backward prediction error amount of the B-frame are already calculated by the motion vector prediction error amount detecting sections 001 and 002 when an optimum motion vector is calculated. However, the bidirectional prediction error amount must be calculated by separately arranging the bidirectional prediction error amount detecting section 003 so that new hardware is required for this calculation.

Namely, the bidirectional prediction error amount detecting section 003 makes a forward directional predicted image block from a forward predicting vector and makes a backward directional predicted image block from a backward predicting vector. The bidirectional prediction error amount detecting section 003 then synthesizes a bidirectional predicted image block by averaging or interpolating both the forward directional predicted image block and the backward directional predicted image block. Further, it is necessary to calculate a prediction error amount between this bidirectional predicted image block and an original image block, and set this calculated prediction error amount to a bidirectional prediction error amount. The bidirectional prediction error amount detecting section 003 makes a calculation by using results of the motion vector/prediction error amount detecting sections 001 and 002. Therefore, there is a restriction in which no calculation of the bidirectional prediction error amount detecting section 003 can be made in parallel with calculations of the motion vector/prediction error amount detecting sections 001 and 002.

SUMMARY OF THE INVENTION

It is therefore an object of the present invention to provide a moving image coder in which a prediction mode is estimated by using only forward and backward prediction error amounts without calculating a bidirectional prediction error amount. Namely, the object of the present invention is to provide a moving image coder for omitting a bidirectional prediction error amount detecting section for calculating a prediction error amount of an interpolated image to make the coder compact.

To achieve the above object, the present invention resides in a moving image coder in which each of frames in a moving image sequence is divided into frame blocks and a data amount of the moving image is compressed by selecting one of a forward prediction mode, a backward prediction mode and a bidirectional prediction mode by using a motion vector every frame block;

the moving image coder comprising:
a forward predicting motion vector/prediction error amount detecting section for detecting an optimum motion vector from a past frame, making a predicted image and calculating a prediction error amount from the present frame;
a backward predicting motion vector/prediction error amount detecting section for detecting an optimum motion vector from a future frame, making a predicted image and calculating a prediction error amount from the present frame; and
a comparator/mode selecting section for inputting the prediction error amounts from said forward predicting motion vector/prediction error amount detecting section and said backward predicting motion vector/ prediction error amount detecting section, making a comparative calculation of the input prediction error amounts, and selecting one of said forward prediction mode, said backward prediction mode and said bidirectional prediction mode.

Namely, to achieve the above object, the moving image coder in the present invention has means for selecting each of the above three frame prediction modes on the basis of only the forward prediction error amount and the backward prediction error amount.

A differential value between the forward prediction error amount and the backward prediction error amount, a ratio of these prediction error amounts, or a combination of the differential value and this ratio may be used in a method for selecting a prediction mode on the basis of only the forward prediction error amount and the backward prediction error amount. In this case, a processing time and a hardware scale of the moving image coder can be reduced while an equivalent image quality can be visually obtained in comparison with a general selecting method.

The above prediction mode selecting means can be used in field predicting coding for separating each of frames into odd and even fields instead of the frame prediction mode. There is a method for selecting one of forward directional, backward directional and bidirectional predictions after a frame or field prediction is selected in frame/field adaptive coding in which the frame prediction mode and the field prediction mode are combined with each other. In this frame/field adaptive coding, there is another method for selecting a frame or field prediction after one of forward directional, backward directional and bidirectional predictions is selected. In each of these two selecting methods, an equivalent image quality can be visually obtained effectively in comparison with a general selecting method while a processing time and a hardware scale of the moving image coder are reduced.

There are two methods for selecting the frame and field predictions. In a first selecting method, a frame/field prediction mode is selected in a prediction system for providing a minimum prediction error amount among a forward frame prediction error amount, a forward field prediction error amount, a backward frame prediction error amount and a backward field prediction error amount. In a second selecting method, a frame/field prediction mode is selected in a system for providing a smaller prediction error amount by comparing a sum of the forward frame prediction error amount and the backward frame prediction error amount with a sum of the forward field prediction error amount and the backward field prediction error amount.

In the moving image coder of the present invention, no bidirectional prediction error image is really generated. Each of the forward prediction mode, the backward prediction mode and the bidirectional prediction mode is judged from a differential value between the forward prediction error amount and the backward prediction error amount, a ratio of these prediction error amounts, or a combination of the differential value and this ratio. When one of the forward prediction error amount and the backward prediction error amount is much greater than the other in this mode judgment, it is considered that the prediction is more precisely made with respect to the smaller prediction error amount. Accordingly, one prediction mode providing the smaller prediction error amount is selected. In contrast to this, when both the prediction error amounts are approximately equal to each other, the moving image coder is operated such that a bidirectional prediction using both past and future is selected. Accordingly, an optimum prediction mode can be selected from the forward directional, backward directional and bidirectional predictions.

Further objects and advantages of the present invention will be apparent from the following description of the preferred embodiments of the present invention as illustrated in the accompanying drawings.

BRIEF DESCRIPTION OF THE DRAWINGS

FIG. 1 is a block diagram showing one constructional example of a motion vector/prediction mode judging section in the moving image coder of the present invention;

FIG. 2 is a flow chart showing the operation of a comparator/mode selecting section in the moving image coder of the present invention;

DESCRIPTION OF THE PREFERRED EMBODIMENTS

The preferred embodiments of a moving image coder in the present invention will next be described in detail with reference to the accompanying drawings.

Figure 9:
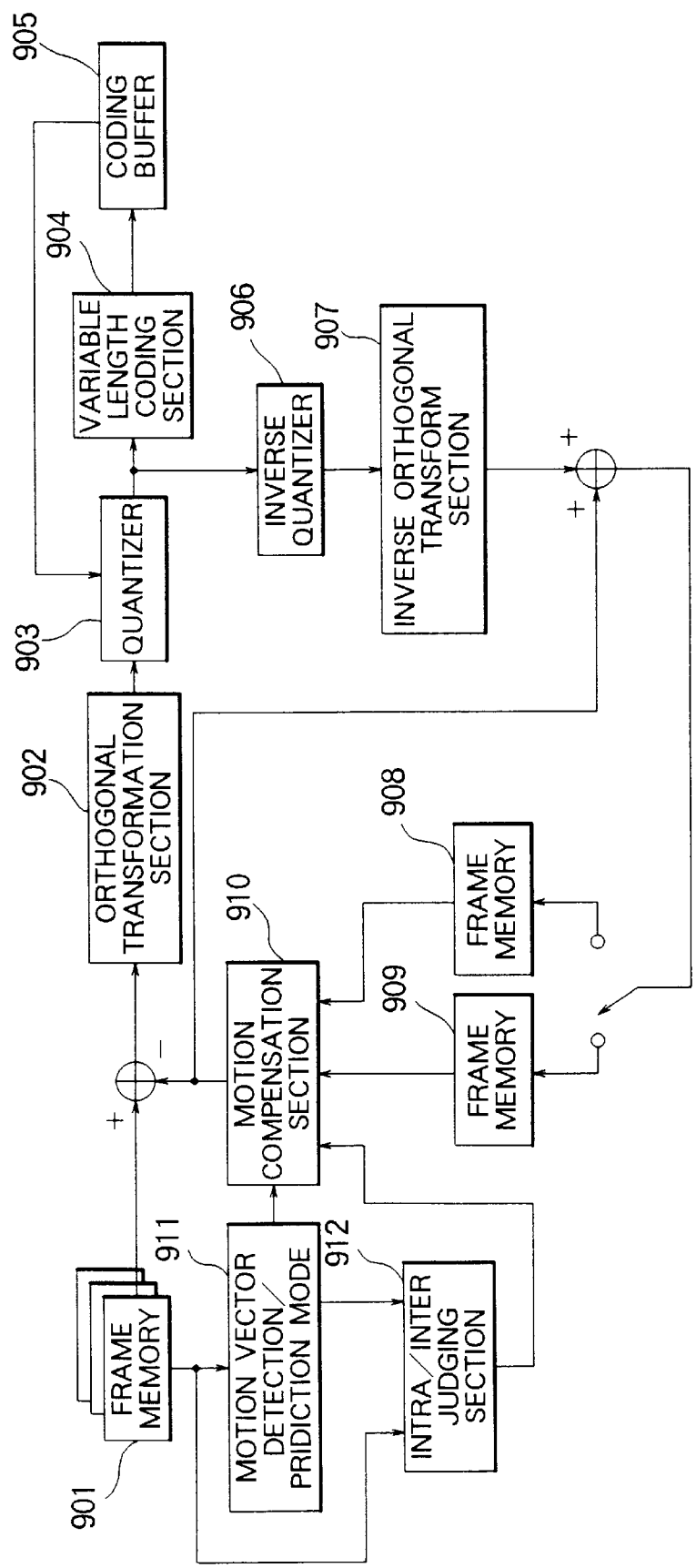
FIG. 9 is a block diagram showing one constructional example of each of a general moving image coder and a moving image coder of the present invention.

The differences between the present invention and the above-mentioned general technique of a moving image coder are a motion vector detection/prediction mode judging section 911 shown in FIG. 9. A motion vector detection/prediction mode judging section in the present invention is shown in FIG. 1.

In FIG. 1, a forward predicting motion vector/prediction error amount detecting section 101 calculates prediction error amounts of past and present frames in a forward prediction, and finds a vector providing a minimum prediction error amount. A backward predicting motion vector/prediction error amount detecting section 102 calculates prediction error amounts of future and present frames in a backward prediction, and finds a vector providing a minimum prediction error amount. A comparator/mode selecting section 104 compares the forward prediction error amount and the backward prediction error amount with each other, and selects an optimum prediction mode from the forward prediction, the backward prediction and a bidirectional prediction.

Figure 10:
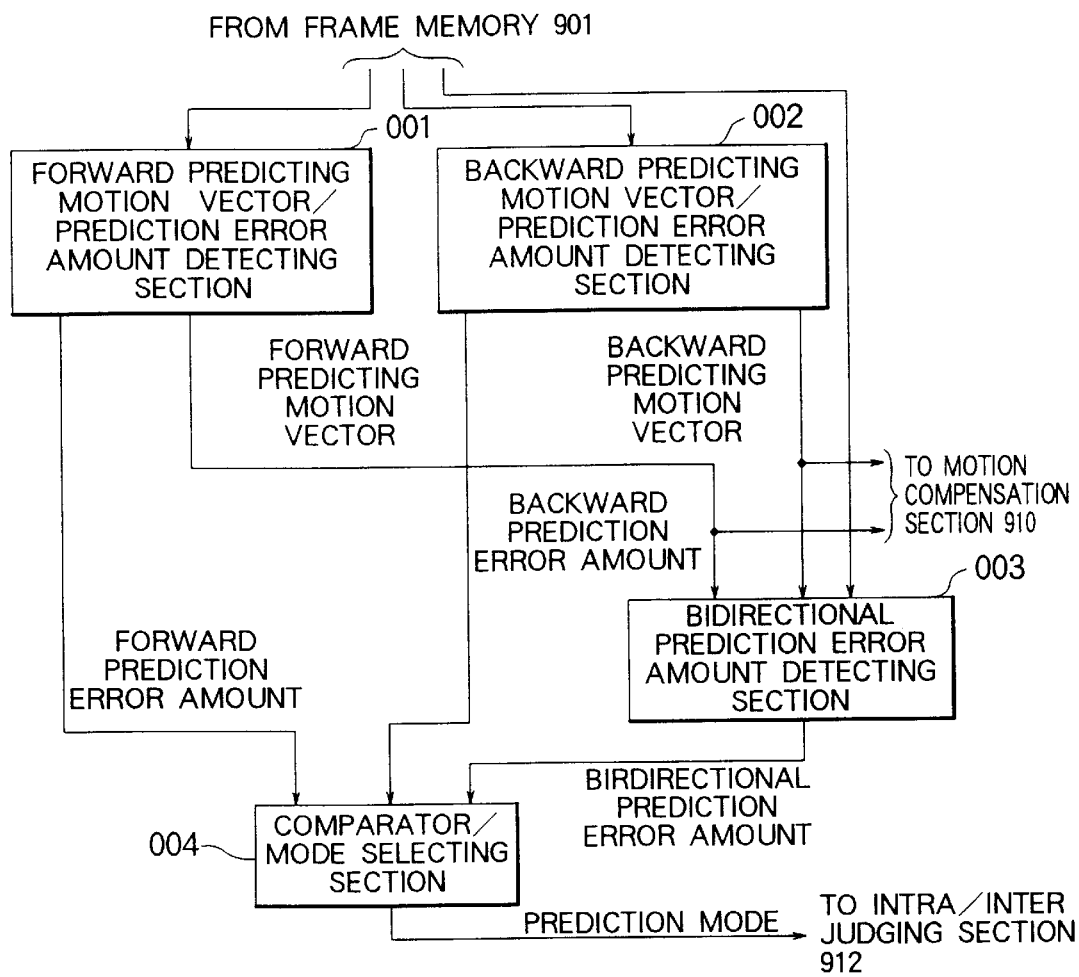
FIG. 10 is a block diagram showing one constructional example of a motion vector/prediction mode judging section in the general moving image coder.
Figure 11:
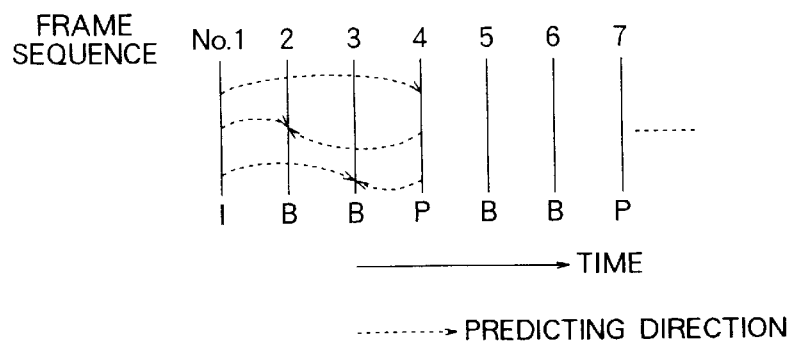
FIG. 11 is a view for explaining a moving image sequence.

In this embodiment, it is not necessary to arrange the bidirectional prediction error amount detecting section 003 required in the general example of the moving image coder shown in FIG. 10. Accordingly, the comparator/mode selecting section 104 instead of this bidirectional prediction error amount detecting section 003 selects each of a forward prediction mode, a backward prediction mode and a bidirectional prediction mode from the forward prediction error amount and the backward prediction error amount.

FIG. 2 is a flow chart showing an operation of the comparator/mode selecting section 104. First, minimum values of the forward prediction error amount of the detecting section 101 and the backward prediction error amount of the detecting section 102 shown in FIG. 1 are calculated. As shown in FIG. 2, a difference D between the forward prediction error amount and the backward prediction error amount, D=forward prediction error amount−backward prediction error amount is then calculated. If this differential value D satisfies the following inequality condition D<TS1 with respect to a predetermined threshold value TS1, the forward prediction is selected. If this differential value D satisfies the following inequality condition D>TS2 with respect to a predetermined threshold value TS2, the backward prediction is selected. If this differential value D satisfies the following condition TS1≦D≦TS2 with respect to the predetermined threshold values TS1 and TS2, the bidirectional prediction is selected.

Figure 3:
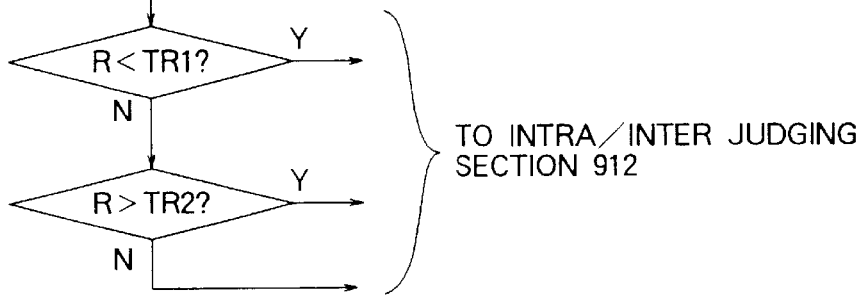
FIG. 3 is a flow chart showing another operation of the comparator/mode selecting section in the moving image coder of the present invention.

There is another selecting method shown in FIG. 3. In this selecting method, a ratio R of the forward prediction error amount to the backward prediction error amount R=forward prediction error amount/backward prediction error amount is calculated. If this ratio R satisfies the following inequality condition R<TR1 with respect to a predetermined threshold value TR1, the forward prediction is selected. If this ratio R satisfies the following inequality condition R>TR2 with respect to a predetermined threshold value TR2, the backward prediction is selected. If this ratio R satisfies the following condition TR1≦R≦TR2 with respect to the predetermined threshold values TR1 and TR2, the bidirectional prediction is selected.

Figure 4:
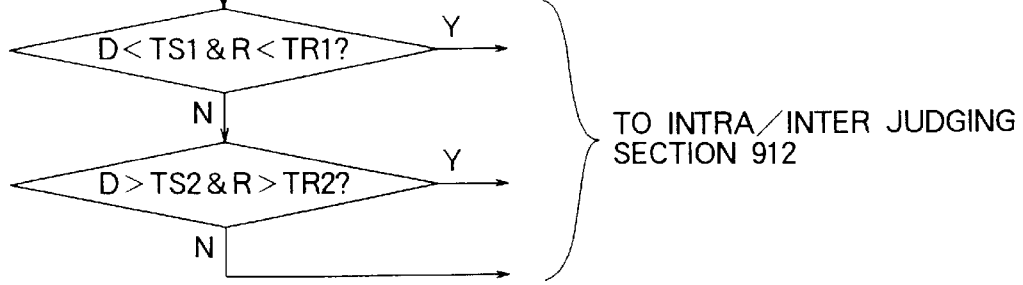
FIG. 4 is a flow chart showing another operation of the comparator/mode selecting section in the moving image coder of the present invention.

Further, there is another selecting method using both the above differential value and the above ratio as shown in FIG. 4. In this selecting method, if D<TS1 and R<TR1 are satisfied, the forward prediction is selected. If D>TS2 and R>TR2 are satisfied, the backward prediction is selected. If TS1≦D≦TS2 or TR1≦R≦TR2 is satisfied, the bidirectional prediction is selected.

The threshold values TS1, TS2, TR1 and TR2 are determined on the basis of experiments or experiences. In one example, it is possible to selectively set TS1=−1000±100, TS2=1000±100, TR1=0.7±0.05 and TR2=1.3±0.05. The above contents are applied to a case using only a frame prediction, but can be similarly applied to a case using only a field prediction. A preferable image quality can be visually obtained by using the above threshold values.

A case adaptively using the frame prediction and the field prediction will next be described.

In this case, there are six kinds of prediction modes of a forward frame, a forward field, a backward frame, a backward field, a bidirectional frame and a bidirectional field. Therefore, the forward predicting motion vector/prediction error amount detecting section 101 and the backward predicting motion vector/prediction error amount detecting section 102 shown in FIG. 1 must make calculations in two kinds of prediction modes composed of frame and field modes. Accordingly, calculating amounts of the forward predicting motion vector/prediction error amount detecting section 101 and the backward predicting motion vector/ prediction error amount detecting section 102 are doubled in comparison with a case of only the frame mode or only the field mode.

Figure 5:
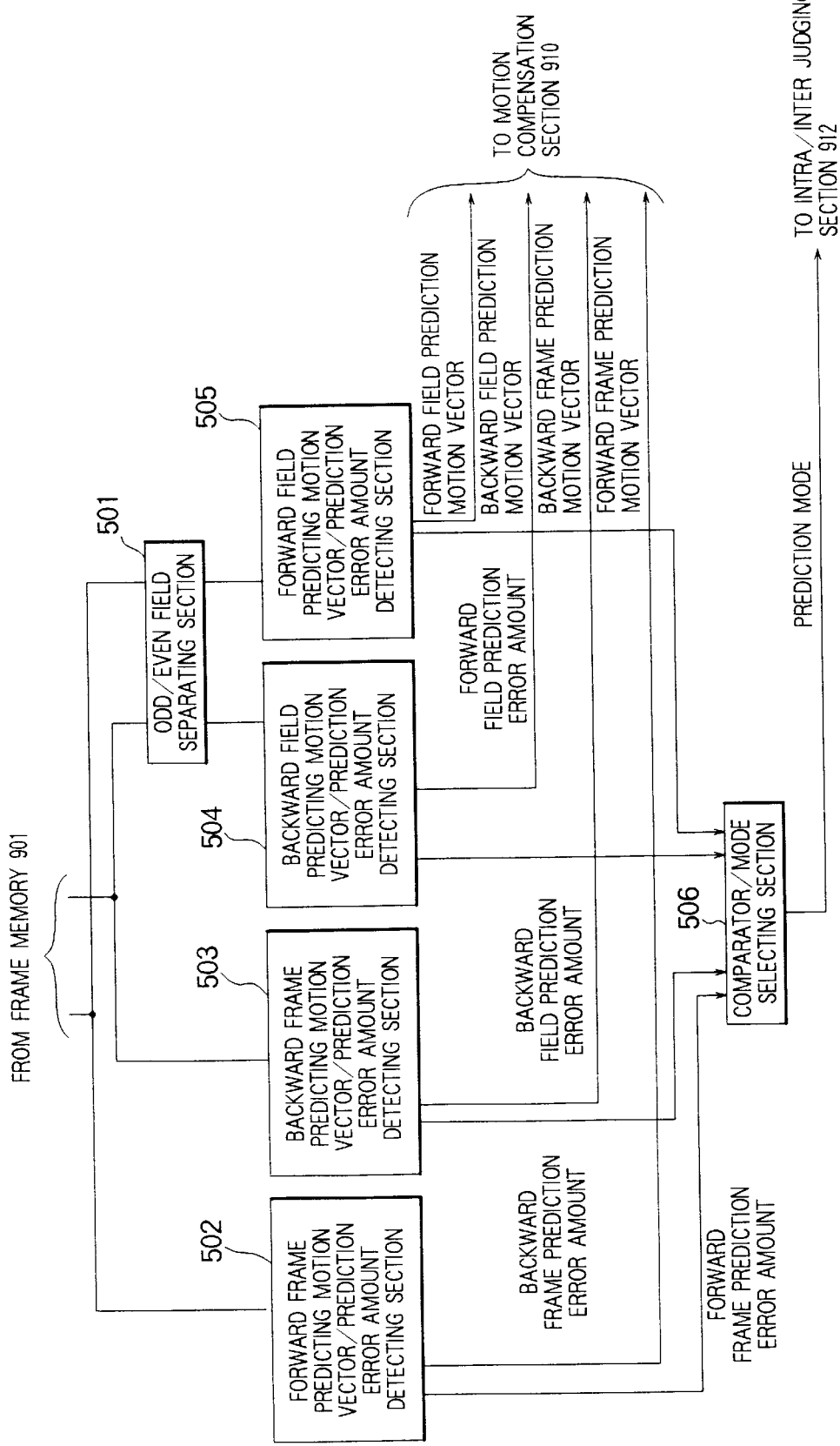
FIG. 5 is a block diagram showing one constructional example of the movement vector/prediction mode judging section in the case of a frame/field adaptive prediction in the moving image coder of the present invention.

FIG. 5 shows a motion vector detection/prediction mode judging section in the case of a frame/field adaptive prediction. An odd/even field separating section 501 separates a frame into odd and even fields. A forward frame predicting motion vector/prediction error amount detecting section 502 calculates a motion vector and a prediction error amount in a forward frame prediction. A backward frame predicting motion vector/prediction error amount detecting section 503 calculates a motion vector and a prediction error amount in a backward frame prediction. A backward field predicting motion vector/prediction error amount detecting section 504 calculates a motion vector and a prediction error amount in a backward field prediction. A forward field predicting motion vector/prediction error amount detecting section 505 calculates a motion vector and a prediction error amount in a forward field prediction.

Here, the field prediction error amount is set to a sum of odd and even field prediction error amounts with respect to the same block as an object block of the frame prediction. A comparator/mode selecting section 506 compares four prediction error amounts of the forward frame, the forward field, the backward frame and the backward field with each other, and then determines a prediction mode.

Figure 6:
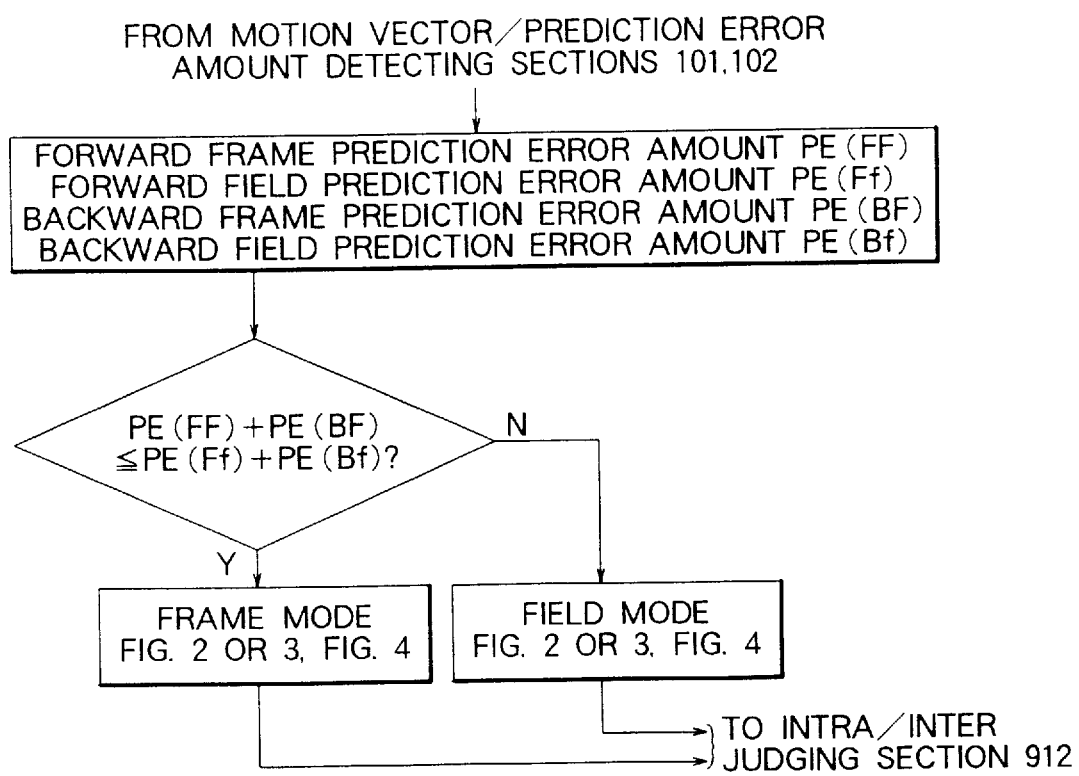
FIG. 6 is a flow chart showing a first example of the operation of the comparator/mode selecting section in the moving image coder of the present invention.

The next description relates to a method for selecting an optimum prediction mode from six kinds of prediction modes including bidirectional prediction modes from the above four kinds of prediction error amounts. FIG. 6 shows a mode selecting method in the case of the frame/field adaptive prediction. A forward frame prediction error amount from the detecting section 502, a forward field prediction error amount from the detecting section 505, a backward frame prediction error amount from the detecting section 503 and a backward field prediction error amount from the detecting section 504 shown in FIG. 5 are used to compare a sum of the forward frame prediction error amount and the backward frame prediction error amount with a sum of the forward field prediction error amount and the backward field prediction error amount. Thus, a prediction mode providing a smaller sum is selected. For example, if the sum of the frame prediction error amounts is smaller, the frame mode is selected. In contrast to this, if the sum of the field prediction error amounts is smaller, the field mode is selected. If the frame or field mode is selected, processings of the flow charts shown in FIGS. 2 to 4 are performed by using the frame or field prediction error amounts with respect to each of the prediction error amounts.

Figure 7:
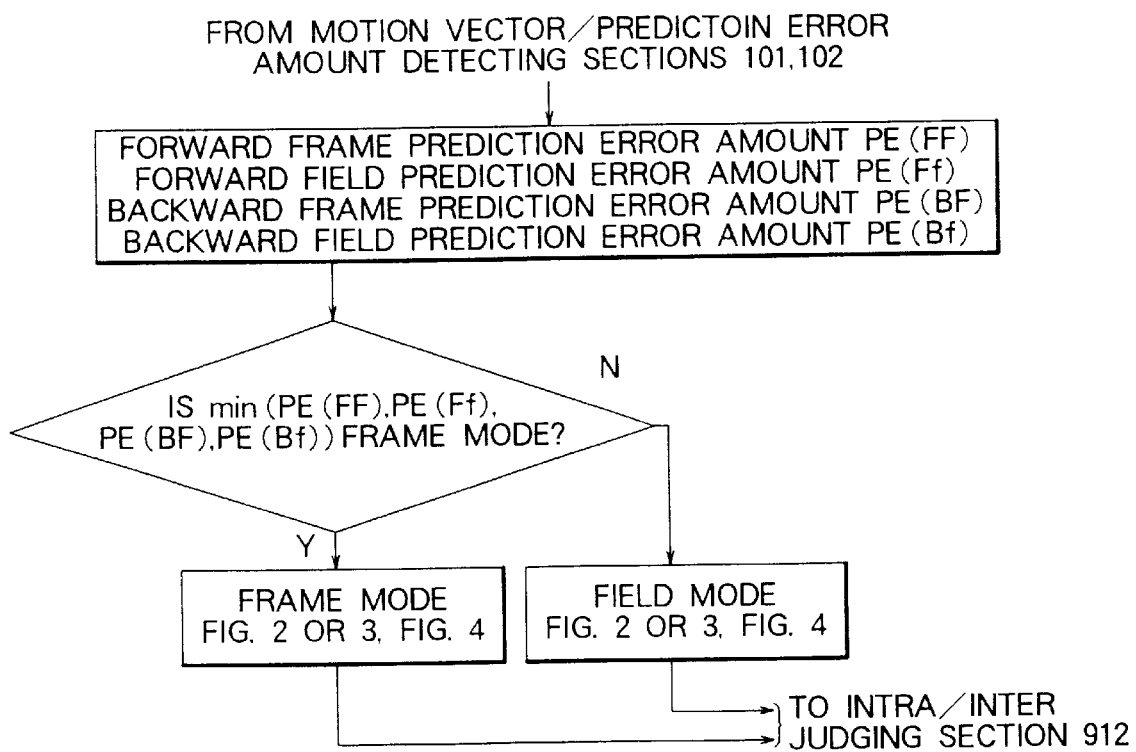
FIG. 7 is a flow chart showing a second example of the operation of the comparator/mode selecting section in the moving image coder of the present invention.

There is another selecting method in which no sum in each of the frame and field modes is used in judgment of the frame and field modes shown in FIG. 6. This selecting method is shown in FIG. 7. In FIG. 7, a frame/field mode providing a minimum prediction error amount is selected from a forward frame, a forward field, a backward frame and a backward field.

Figure 8:
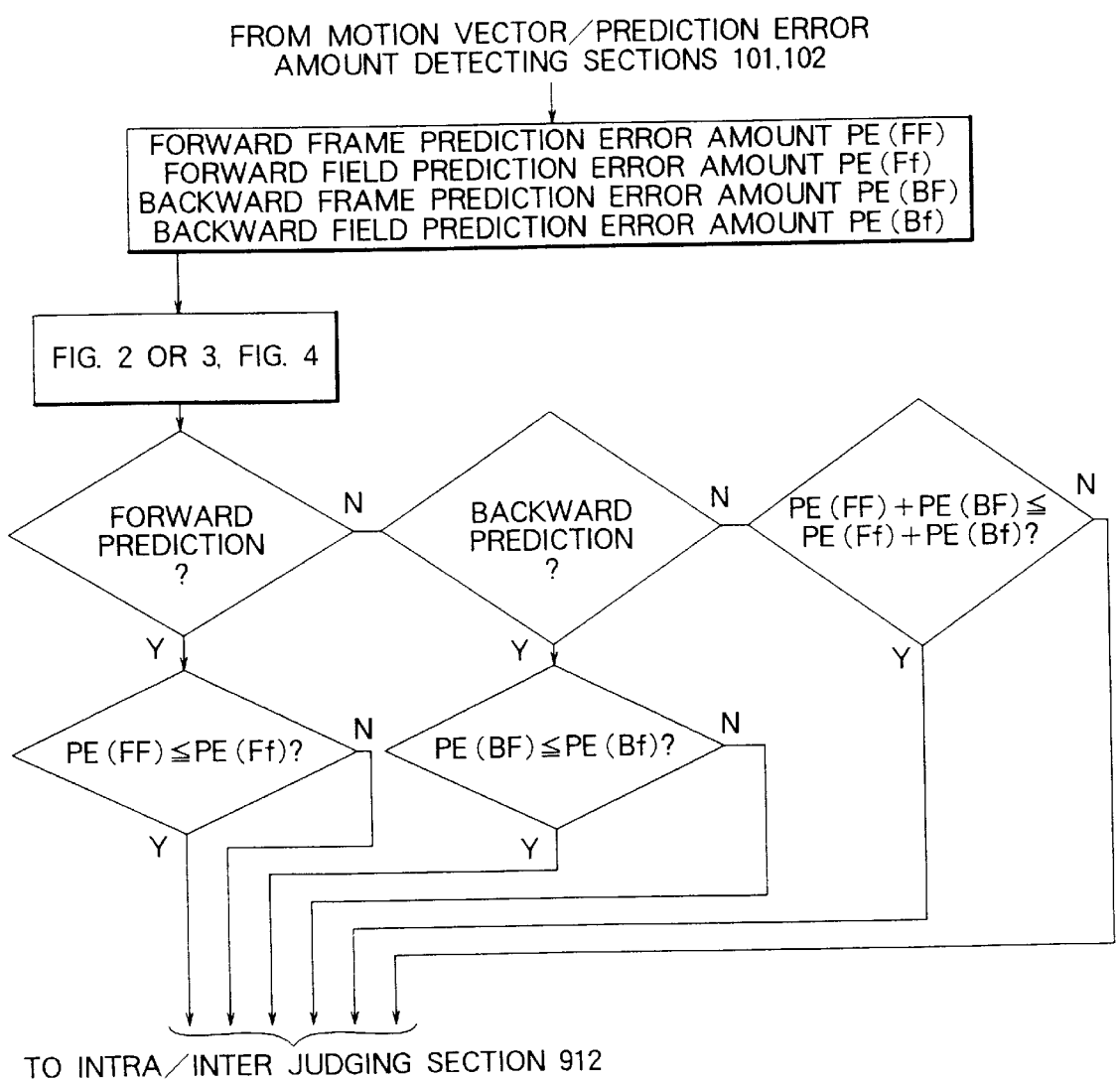
FIG. 8 is a flow chart showing another operation of the comparator/mode selecting section in the moving image coder of the present invention.

In a selecting method shown in FIG. 8, one of a forward prediction mode, a backward prediction mode and a bidirectional prediction mode is first selected. Each of frame and field modes is selected with respect to the selected prediction mode. Each of the forward prediction mode, the backward prediction mode and the bidirectional prediction mode is selected in accordance with the flow charts of FIGS. 2 to 4 by using the forward frame prediction error amount from the detecting section 502, the forward field prediction error amount from the detecting section 505, the backward frame prediction error amount from the detecting section 503 and the backward field prediction error amount from the detecting section 504 shown in FIG. 5.

At this time, a sum of the forward frame prediction error amount and the forward field prediction error amount is used as the forward prediction error amount. A sum of the backward frame prediction error amount and the backward field prediction error amount is used as the backward prediction error amount. In a selected prediction mode, the frame prediction error amount and the field prediction error amount are compared with each other, and a prediction mode providing a smaller prediction error amount is selected. In a bidirectional case, a sum of the forward frame prediction error amount and the backward frame prediction error amount is set to the frame prediction error amount. Further, a sum of the forward field prediction error amount and the backward field prediction error amount is set to the field prediction error amount.

Each of the forward directional, backward directional and bidirectional prediction modes can be selected by the above-mentioned selecting method without arranging a bidirectional prediction error amount detecting section within the moving image coder.

The moving image coder of the present invention constructed above has the following effects.

When each of frames is divided into frame blocks and an optimum prediction mode is selected from forward directional, backward directional and bidirectional prediction modes every frame block, only forward and backward prediction error amounts are used without calculating a bidirectional prediction error amount. Therefore, no circuit for calculating the bidirectional prediction error amount is required so that a circuit scale of the moving image coder can be reduced. Further, since no bidirectional prediction error amount is calculated, a time required for processings can be reduced.

The optimum prediction mode can be selected more accurately by using a differential value between the forward prediction error amount and the backward prediction error amount, a ratio of these prediction error amounts, or a combination of the differential value and this ratio. Further, the above effects can be also obtained with respect to each of field prediction co-ding and frame/field adaptive prediction coding.

In the frame/field predicting coding, selection of each of the forward directional, backward directional and bidirectional prediction modes is separated from the selection of each of a frame and a field. Accordingly, the above selecting methods can be used in the selection of each of the forward directional, backward directional and bidirectional prediction modes.

Many widely different embodiments of the present invention may be constructed without departing from the spirit and scope of the present invention. It should be understood that the present invention is not limited to the specific embodiments described in the specification, except as defined in the appended claims.

What is claimed is:

1. A moving image coder in which each of frames in a moving image sequence is divided into frame blocks and a data amount of the moving image is compressed by selecting one of a forward prediction mode, a backward prediction mode and a bidirectional prediction mode by using a motion vector for every frame block;

the moving image coder comprising:
    a forward predicting motion vector/prediction error amount detecting section for detecting an optimum motion vector from a past frame, making a predicted image and calculating a first prediction error amount from a present frame;
    a backward prediction motion vector/prediction error amount detecting section for detecting an optimum motion vector from a future frame, making a predicted image arid calculating a second prediction error amount from the present frame; and
    a comparator/mode selecting section for receiving the first prediction error amount from said forward predicting motion vector/prediction error amount detecting section and the second prediction error amount from said backward predicting motion vector/prediction error amount detecting section, calculating a parameter as a function of difference between and/or ratio of the first and second prediction error amounts and selecting one of said forward prediction mode, said backward prediction mode and said bidirectional prediction mode, by comparing a value of said parameter with predetermined thresholds, so that the selecting operation is performed without calculating bidirectional prediction error amount based on the forward prediction motion vector and the backward prediction motion vector.

2. A moving image coder as claimed in claim 1, wherein the prediction error amounts from the forward predicting motion vector/prediction error amount detecting section and the backward predicting motion vector/prediction error amount detecting section are compared with each other in the comparator/mode selecting section by a differential value between these prediction error amounts.

3. A moving image coder as claimed in claim 1, wherein the prediction error amounts from the forward predicting motion vector/prediction error amount detecting section and the backward predicting motion vector/prediction error amount detecting section are compared with each other in the comparator/mode selecting section by a ratio of these prediction error amounts.

4. A moving image coder as claimed in claim 1, wherein the prediction error amounts from the forward predicting motion vector/prediction error amount detecting section and the backward predicting motion vector/prediction error amount detecting section are compared with each other in the comparator/mode selecting section by combining a differential value between these prediction error amounts with a ratio of these prediction error amounts.

5. A moving image coder as claimed in claim 1, wherein the moving image coder further comprises:
    an odd/even field separating section for separating odd and even fields from each other;
    a forward field predicting motion vector/prediction error amount detecting section for detecting a forward field predicting motion vector and a prediction error amount every each of the separated odd and even fields;
    a backward field predicting motion vector/prediction error amount detecting section for detecting a backward field predicting motion vector and a prediction error amount; and
    a comparator/mode selecting section.

6. A moving image coder as claimed in claim 1, wherein the moving image coder is arranged in a frame/field adaptive predicted moving image coder having six kinds of prediction modes obtained by combining three prediction modes composed of said forward prediction mode, said backward prediction mode and said bidirectional prediction mode with two prediction modes composed of a frame prediction mode and a field prediction mode;

the frame/field adaptive predicted moving image coder comprises:
    said forward frame predicting motion vector/prediction error amount detecting section;
    said backward frame predicting motion vector/ prediction error amount detecting section;
    said odd/even field separating section;
    said forward field predicting motion vector/prediction error amount detecting section;
    said backward field predicting motion vector/prediction error amount detecting section; and
    said comparator/mode selecting section, and
    this comparator/mode selecting section determines selection of any one of the forward prediction mode, the backward prediction mode and the bidirectional prediction mode after the frame prediction mode or the field prediction mode is determined in use.

7. A moving image coder as claimed in claim 6, wherein each of the frame prediction mode and the field prediction mode in the comparator/mode selecting section is selectively set to a frame/field mode in a prediction system for providing a minimum prediction error amount among a forward frame prediction error amount, a forward field prediction error amount, a backward frame prediction error amount and a backward field prediction error amount;

the forward field prediction error amount is set to a sum of a forward directional odd field prediction error amount and a forward directional even field prediction error amount with respect to the same block as an object block of said forward frame prediction; and the backward field prediction error amount is set to a sum of a backward directional odd field prediction error amount and a backward directional even field prediction error amount with respect to the same block as an object block of said backward frame prediction.

8. A moving image coder as claimed in claim 6, wherein a sum of said forward frame prediction error amount and said backward frame prediction error amount is compared with a sum of said forward directional odd field prediction error amount, said forward directional even field prediction error amount, said backward directional odd field prediction error amount and said backward directional even field prediction error amount; and each of the frame prediction mode and the field prediction mode in the comparator/mode selecting section is selectively set to a frame/field mode in a prediction system for providing a smaller prediction error amount among said two sums.

9. A moving image coder as claimed in claim 1, wherein the moving image coder is arranged in a frame/field adaptive predicted moving image coder having six kinds of prediction modes obtained by combining three prediction modes composed of said forward prediction mode, said backward prediction mode and said bidirectional prediction mode with two prediction modes composed of a frame prediction mode and a field prediction mode;

the frame/field adaptive predicted moving image coder comprises:

said forward frame predicting motion vector/prediction error amount detecting section;

said backward frame predicting motion vector/prediction error amount detecting section;

said odd/even field separating section;

said forward field predicting motion vector/prediction error amount detecting section;

said backward field predicting motion vector/prediction error amount detecting section; and said comparator/mode selecting section, and a sum of said forward frame prediction error amount, said forward directional odd field prediction error amount and said forward directional even field prediction error amount, and a sum of said backward frame prediction error amount, said backward directional odd field prediction error amount and said backward directional even field prediction error amount are input to said comparator/mode selecting section; and selection of the frame prediction mode or the field prediction mode is determined by selecting a smaller one of said frame prediction error amount and the field prediction error amount as a sum of said odd field prediction error amount and said even field prediction error amount after one of the forward prediction mode, the backward prediction mode and the bidirectional prediction mode is determined in use.

10. A method for selecting one of a forward prediction mode, a backward prediction mode and a bidirectional prediction mode to be used for compressing a moving image sequence divided into frame blocks, comprising the steps of:

detecting an optimum motion vector from a past frame, making a prediction image, and calculating a first prediction error amount from a present frame;

detecting an optimum motion vector from a future frame, making a predicted image, and calculating a second prediction error amount from the present frame;

calculating a parameter as a function of difference between and/or ratio of said first and second prediction error amounts; and selecting one of said forward prediction mode, said backward prediction mode and said bidirectional prediction mode by comparing a value of said parameter with predetermined thresholds, so that the selecting operation is performed without calculating bidirectional prediction error amount based on the forward prediction motion vector and the backward prediction motion vector.

11. A method as claimed in claim 10, wherein said step of calculating said parameter includes setting said parameter equal to a differential value between said first and said second prediction error amounts.

12. A method as claimed in claim 10, wherein said step of calculating said parameter includes setting said parameter equal to a ratio of said first and said second prediction error amounts.

13. A method as claimed in claim 10, wherein said step of calculating said parameter includes setting a first parameter equal to a difference between said first and said second prediction error amounts and setting a second parameter equal to a ratio of said first and said second prediction error amounts, and said selecting step is performed in accordance with a value of said first parameter and a value of said second parameter.

14. A method as claimed in claim 10 further comprising:

separating odd and even fields from each other;

detecting a forward field prediction motion vector and a prediction error amount every each of the separated odd and even fields; and a backward field prediction motion vector and a prediction error amount.

15. A method as claimed in claim 14, wherein modes to be selected include six kinds of prediction modes obtained by combining three prediction modes composed of said forward prediction mode, said backward prediction mode and said bidirectional prediction mode with two prediction modes composed of a frame prediction mode and a field prediction mode, wherein said selecting step includes selecting of any one of the forward prediction mode, the backward prediction mode and the bidirectional prediction mode after determining whether the frame prediction mode or the field prediction mode is used.

16. A method as claimed in claim 15 further comprising:

setting said forward field prediction error amount equal to a sum of a forward directional odd field prediction error amount and a forward directional even field prediction error amount with respect to the same block as an object block of said step of detecting from said past frame; and setting said backward field prediction error amount equal to a sum of a backward directional odd field prediction error amount and a backward directional even field prediction error amount with respect to the same block as an object block of said step of detecting from said future frame.

17. A method as claimed in claim 15, further comprising:

comparing a sum of said forward frame prediction error amount and said backward frame prediction error amount with a sum of said forward directional odd field prediction error amount, said forward directional even field prediction error amount, said backward directional odd field prediction error amount and said backward directional even field prediction error amount; and selectively setting each of the frame prediction mode and the field prediction mode to a frame/field mode in a prediction system for providing a smaller prediction error amount among said two sums.

18. A method as claimed in claim 15, wherein modes to be selected include six kinds of prediction modes obtained by combining three prediction modes composed of said forward prediction mode, said backward prediction mode and said bidirectional prediction mode with two prediction modes composed of a frame prediction mode and a field prediction mode, further comprising:

computing a sum of said forward frame prediction error amount, said forward directional odd field prediction error amount and said forward directional even field prediction error amount, and a sum of said backward frame prediction error amount, said backward directional odd field prediction error amount and said backward directional even field prediction error amount; and selecting the frame prediction mode or the field prediction mode by selecting a smaller one of said frame prediction error amount and said field prediction error amount as a sum of said odd field prediction error amount as a sum of said odd field prediction error amount and said even field prediction error amount after determining which one of the forward prediction mode, the backward prediction mode and the bidirectional prediction mode is in use.

\* \* \* \* \*